United States Patent

Thompson

[15] 3,661,237
[45] May 9, 1972

[54] WATER-COOLED VISCOUS COUPLING

[72] Inventor: Owen R. Thompson, Lexington, Ky.

[73] Assignee: Eaton Corporation, Cleveland, Ohio

[22] Filed: Nov. 19, 1969

[21] Appl. No.: 878,136

[52] U.S. Cl..........................192/58 B, 123/41.11, 123/41.46, 165/105, 192/113 B
[51] Int. Cl...................................F16d 35/00, F16d 13/72
[58] Field of Search..................192/58 A, 58 B, 58 C, 113 B, 192/82 T; 123/41.11, 41.12, 41.46; 165/105

[56] References Cited

UNITED STATES PATENTS

| | | | |
|---|---|---|---|
| 2,633,697 | 4/1953 | Johnson | 192/82 T UX |
| 2,743,384 | 4/1956 | Turner | 165/105 UX |
| 2,988,188 | 6/1961 | Tauschek | 192/58 C X |
| 3,151,669 | 10/1964 | Quenneville | 165/105 X |
| 3,272,188 | 9/1966 | Sabat | 192/58 A |
| 3,505,982 | 4/1970 | Walter et al. | 123/41.12 |
| 2,852,118 | 9/1958 | Lacroix, Jr. et al. | 192/113 B |
| 2,982,377 | 5/1961 | Eames | 192/113 B |
| 3,512,622 | 5/1970 | Sutaruk | 192/58 B |

Primary Examiner—Allan D. Herrmann
Attorney—Yount and Tarolli

[57] ABSTRACT

A viscous coupling includes an input and an output member which define a shear space therebetween. Viscous fluid in the shear space operates to transmit torque between the input and output members. When torque is transmitted between the input and output members, heat is generated. One of the members has a cooling medium chamber to receive a cooling medium from a cooling medium conduit. The conduit is positioned substantially in alignment with the rotational axis of the input and output members. The cooling medium gravitates toward the outer peripheral surfaces of the cooling medium chamber and vaporizes upon application of sufficient heat thereto. The vapor gravitates toward the rotational axis of the members and is subsequently cooled.

11 Claims, 3 Drawing Figures 3,661,237

INVENTOR
OWEN R. THOMPSON

BY Yount and Tarolli
ATTORNEYS

INVENTOR
OWEN R. THOMPSON
BY Yount and Tarolli
ATTORNEYS

WATER-COOLED VISCOUS COUPLING

The present invention relates to a viscous coupling having an input member and an output member defining a fluid shear space therebetween and between which torque is transmitted by fluid in the shear space, and particularly relates to a viscous coupling having improved means for dissipating heat generated by transmission of torque between the input and output members.

Viscous couplings are commonly used for driving a cooling fan associated with the engine of an automobile. Automobile engine fan cooling requirements have been increasing because of the increasing horsepower of engines, reduced frontal or ram air area, and smog control heat loads. As a result of these increases in fan cooling requirements, design changes have been made in the viscous couplings for driving a fan.

The major problem in the development of a viscous coupling to handle these higher fan cooling requirements is the dissipation of heat generated by the transmission of torque between the coupling members. By reducing the internal temperature of a viscous coupling, bearing life is lengthened and temperature-sensitive mechanical fluids for transmitting torque between the coupling members survive. As a result, the viscous coupling has a longer life and has a greater torque-transmitting capability. In fact, by dissipating the heat effectively, a greater torque-carrying capacity will be realized in equal or even smaller sized viscous couplings.

It is to be understood that the less the temperature of a viscous coupling increases, the more effective the coupling is. When the temperature of a viscous coupling increases, the viscosity of the fluid in the shear space between the input and output members of the viscous coupling decreases. Thus, a greater shear area to transmit an equivalent amount of torque is required. By maintaining the viscous coupling at a lower temperature, it is possible to provide greater torque-carrying capacities in the coupling by maintaining the viscous fluid at a higher viscosity. Moreover, the life of the bearings associated with the coupling is increased when the viscous coupling is effectively cooled.

The present invention provides a new and improved viscous coupling having means for dissipating heat generated in the viscous coupling when torque is transmitted between the input and output members of the coupling. The heat is dissipated by providing a liquid cooling medium in a chamber of one of the members of the coupling and providing for cooling the liquid cooling medium after it has absorbed heat.

When such a liquid-cooled viscous coupling is used in conjunction with a liquid-cooled engine, the cooling medium used to cool the engine may also be used to cool the coupling. Moreover, when such an engine is equipped with a pump, it is possible to provide the cooling medium to the viscous coupling under pressure and maintain a pressure in the cooling medium chamber. By maintaining the cooling medium in the chamber under pressure, a greater quantity of heat is required to vaporize the cooling medium. Thus, the effectiveness of such a cooling system is further increased.

The viscous coupling of the present invention includes a conduit having an axis substantially co-extensive with the rotational axis of the input and output coupling members. The cooling medium tends to flow along the peripheral surface of the conduit into the cooling medium chamber, due to the centrifugal force created by rotation of the conduit with the member in which the cooling medium chamber is positioned. Upon vaporization of the cooling medium in the chamber, the vapor gravitates toward the center of the chamber and flows to a central location in the conduit where the vapor is condensed by contact with and/or cooling by the liquid cooling medium. Such a construction efficiently cools the vapor produced by evaporation of the cooling medium and prevents temperature-sensitive mechanical fluids from breaking down.

Accordingly, it is an object of the present invention to provide a new and improved viscous coupling constructed to effectively dissipate heat generated by the shear of a viscous fluid when torque is transmitted between the input and the output members of the viscous coupling, thereby increasing the torque-transmitting capability of the coupling.

Another object of the present invention is the provision of a new and improved viscous coupling having input and output members defining a shear space therebetween and between which torque is transmitted by viscous fluid in the shear space and wherein the viscous coupling includes means providing for liquid cooling thereof.

Yet another object of the present invention is the provision of an apparatus for transmitting torque having an input member and an output member in which one of the members has a chamber for receiving a liquid cooling medium and wherein the cooling medium vaporizes upon sufficient heating and gravitates to the rotational center of the chamber such that liquid cooling medium is always maintained in contact with the outer peripheral surface of the chamber.

A further object of the present invention is the provision of a new and improved apparatus for transmitting torque having an input member and an output member and wherein one of the members is adapted to dissipate heat generated by the transmission of torque between the input and output members and has a chamber for receiving a cooling medium under pressure which vaporizes upon sufficient heating and gravitates to the center of the chamber.

Yet another object of the present invention is the provision of a new and improved apparatus for transmitting torque between an input member and an output member wherein one of the members is adapted to dissipate heat generated by the transmission of torque between the input and output members and has a chamber for receiving cooling medium from a conduit whereby the heat vaporizes the cooling medium and the vapor gravitates to the center of the chamber where it is cooled.

Further objects and advantages of the present invention will be apparent to those skilled in the art to which it relates from the following detailed description of embodiments of the present invention made with reference to the accompanying drawings in which.

Figure 1:
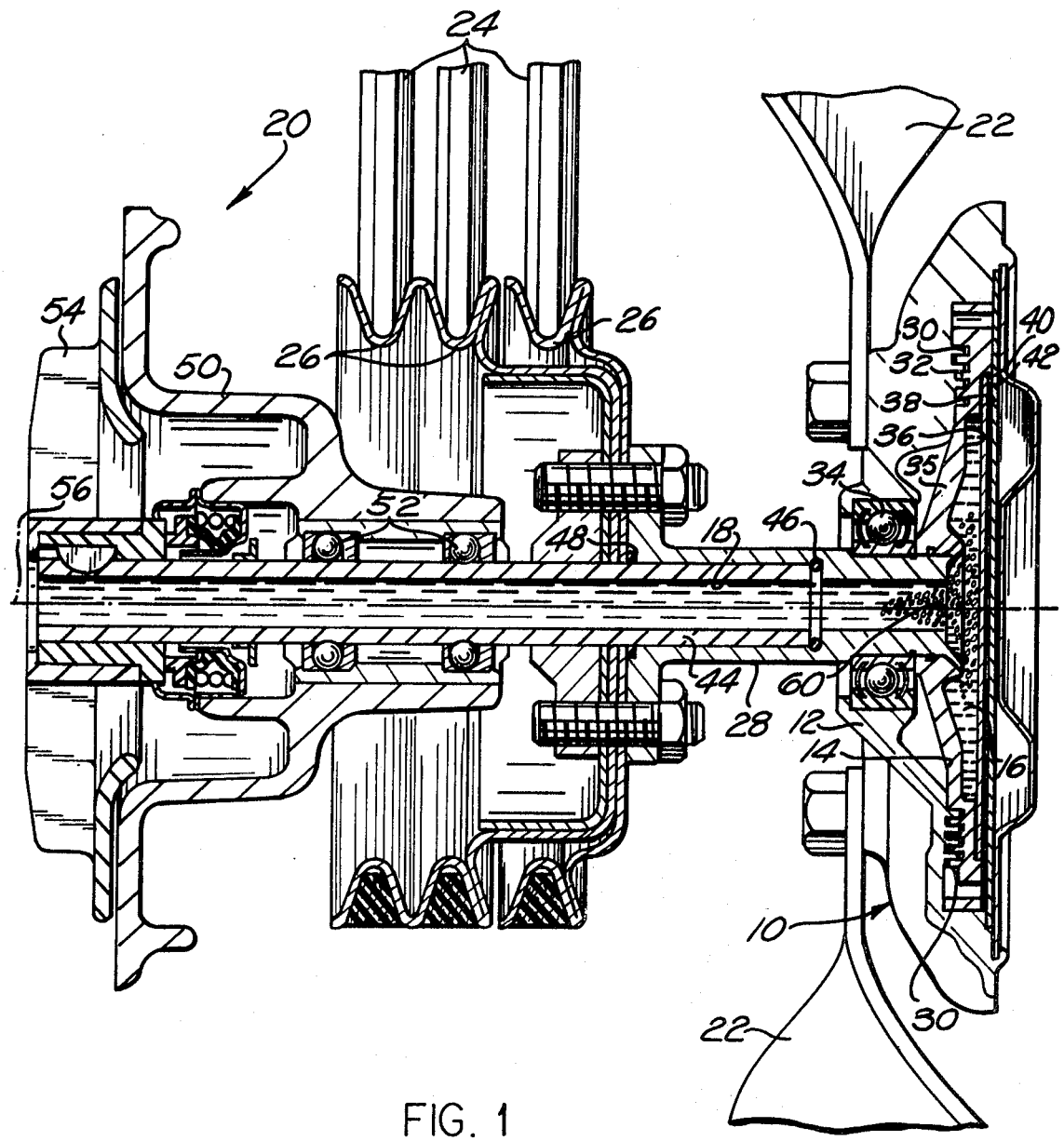
FIG. 1 is a cross-sectional view of an apparatus embodying the present invention.

The present invention provides an improved viscous coupling having an input member and an output member with an improved means for dissipating heat created due to the transmission of torque therebetween. In general, one of the members has a chamber for receiving a liquid cooling medium. The cooling medium vaporizes upon receiving sufficient heat and which, upon vaporization, gravitates to the center of the chamber and is subsequently cooled. By effectively cooling the viscous coupling of the present invention, the life of the bearings of the coupling are lengthened and the torque-carrying capacity of the viscous coupling may be substantially increased. The present invention may be applied to viscous coupling of a wide variety of constructions and uses and for purposes of illustration is described and illustrated in the drawings as applied to a viscous coupling 10, as shown in FIG. 1.

The viscous coupling 10 is illustrated as associated with an internal combustion engine of an automobile. In order to cool such an internal combustion engine, a water pump, partially shown at 20, is provided to circulate a cooling medium, such as water, around the motor to absorb the heat created by combustion in the motor in a manner well known to those skilled in the art. To cool this cooling medium or water, a radiator is generally provided having a plurality of thin tubes through which the heated water flows. Air is forced through the radiator to cool the water and provide a supply of cooled water to the water pump 20 for recirculation through the motor.

In order to draw air through the radiator, a fan 22 is driven by the viscous coupling 10 from the motor. The fan pulls air through the radiator and thereby assists the air forced through the radiator by the forward translational movement of the vehicle to provide a sufficient amount of air flowing through the radiator to effect cooling of the water, as is known.

It should be understood that the viscous coupling 10 is ideally suited for moving air through a radiator, since the fan is required to move more air through the radiator when the car is not in motion or when the car is traveling at a relatively low speed. A characteristic of the viscous coupling 10 is that the rotational output speed of the viscous coupling will not increase proportionally with an increase in the input speed of the viscous coupling. Accordingly, as the speed of the vehicle increases, the fan is not driven at a proportionally increased speed. This is ideal, since more ram air is provided through the radiator and since the exposed frontal area allows air to flow through the radiator as the speed of the vehicle increases.

The viscous coupling 10 includes an input coupling member 14 and an output coupling member 12. The fan 22 is suitably secured to the output coupling member 12 and rotated upon rotation of the output member 12. The output member 12 is driven by the action of viscous shear fluid located between the input and output members, as will be discussed below. The input member 14 is drivingly connected to a drive member 28. Drive pulleys 26 are connected to the drive member 28, and belts 24 are trained around the pulleys 26 and rotate the pulleys. The belts are suitably driven from the crankshaft of the engine.

As noted above, the drive between the input and output members 14, 12 is effected by the action of viscous shear fluid positioned therebetween. The output member 12 has a plurality of grooves 30 therein in which portions 32 of the input member 14 are received, as is known. The surfaces of the input member are spaced slightly from the surfaces of the output member to provide a fluid shear space therebetween. The viscous fluid is contained in the shear space and is in contact with the input and output members 14, 12, respectively. When the input member 14 is rotated, the viscous fluid contained in the grooves 30 transmits torque to the output member 12 to which the fan 22 is attached. The output member 12 is rotatably mounted on the drive member 28 by bearing 34 such that the output member 12 may rotate relative to the input member 14 about a common rotational axis 56.

Heat is generated when the viscous fluid in the shear space is sheared during transmission of the torque between the input member 14 and the output member 12. This heat, of course, decreases the viscosity of the viscous fluid. As the viscosity of the fluid decreases, the coupling 10 transmits less torque from the input member 14 to the output member 12 and, thus, rotates the fan 22 at proportionally slower speed with respect to the speed of the motor.

The generation of this heat effects not only the capability of the viscous fluid to transmit torque, but also effects bearing life and overall effectiveness and durability of the viscous coupling. These problems are becoming more acute due to the increased torque demands for viscous couplings. This demand results from increased engine horsepower, reduced frontal area, and smog control heat loads. In order to effectively handle these demands, it is necessary to provide for more effective dissipation of heat generated by a coupling than is possible with known techniques for heat dissipation in viscous couplings.

In order to dissipate heat generated by the transmission of torque between the coupling members 14, 12, one of the members is constructed so as to be liquid cooled. In the illustrated embodiment, the input member 14 is provided with a cooling medium chamber 16. The chamber 16 in the input member 14 is provided with a cooling medium through a conduit 18. The input member 14 includes a body 35 and a cover member 38. The chamber 16 is defined by the outer surface 36 of the body 35 and the cover 38 secured to the body 35. The outer surface 36 of the input member 14 extends circumferentially about the rotational axis of the viscous coupling 10. The cover 38 is positioned against a surface 40 on the body 35. A portion 42 of the body 35 is rolled over the outside of the cover 38 to retain the cover 38 with respect to the surface 40 of the body 35. This connection effects a fluid-tight seal which is simple to manufacture and provides a chamber for receiving the cooling medium for efficiently cooling the viscous coupling 10.

The cooling medium is received by the chamber 16 through the conduit 18. The conduit 18 includes the drive member 28, which is hollow, and the conduit member 44. The conduit member 44 is connected with the drive member 28 by means of a press fit therebetween. Sealing means 46, 48 are provided to seal the conduit member 44 and drive member 28 to prohibit leakage of the cooling medium from the conduit 18.

The cooling medium in the illustrated embodiment comprises the cooling medium which is in the cooling system of the vehicle and would comprise water or a mixture of water, antifreeze, additives, or the like. The conduit 44 communicates with the water pump 20 and receives cooling medium therefrom. The pump 20 includes a housing member 50 mounted on the engine and rotatably supports the conduit member 44 therein by means of bearings 52. An impeller 54 of the pump 20 is drivingly connected to the conduit member 44 and is rotated by the conduit member 44 which is driven from the pulleys 26. The impeller 54 of the pump 20 pressurizes the cooling medium. The pressurized fluid is directed into the end of the conduit member 44 secured to the impeller 54 and flows therealong into the chamber 16 to cool the viscous coupling 10. When the cooling medium 16 is heated sufficiently, it vaporizes in the chamber 16. The vapor will gravitate toward the rotational axis 56 of the chamber 16, connecting member 28 and conduit member 44, and the liquid cooling medium is forced toward the outer walls of the conduit 18 due to the centrifugal force acting thereon. The vapor gravitates or is displaced toward the center or rotational axis of the viscous coupling and is illustrated at 60 in the drawing. The cooling medium in contact with the vapor will cool and condense the vapor.

When the vapor is formed from the cooling medium, the cooling medium must receive its latent heat of vaporization from the coupling in order to vaporize and must give up the latent heat of vaporization to the liquid cooling medium in order to condense. Thus, by such a heat transfer process, the viscous coupling 10 is effectively and efficiently cooled. It should be understood that the greater the pressure at which the cooling medium is supplied, the higher the temperature that is required to vaporize the cooling medium.

In the event that a substantial volume of heat is generated which results in substantial amounts of vapor being created, the vapor may return through the conduit 44 to the pump 20 and be condensed in the pump 20. In such a case, fluid would flow from the pump 20 through the conduits 44, 18 into the cooling medium chamber 16 while vapor is flowing in the opposite direction. This is possible due to the fact that the fluid medium being heavier hugs the walls of the conduits 44, 18, while the vapor moves through the central portion thereof, as noted above.

Figure 2:
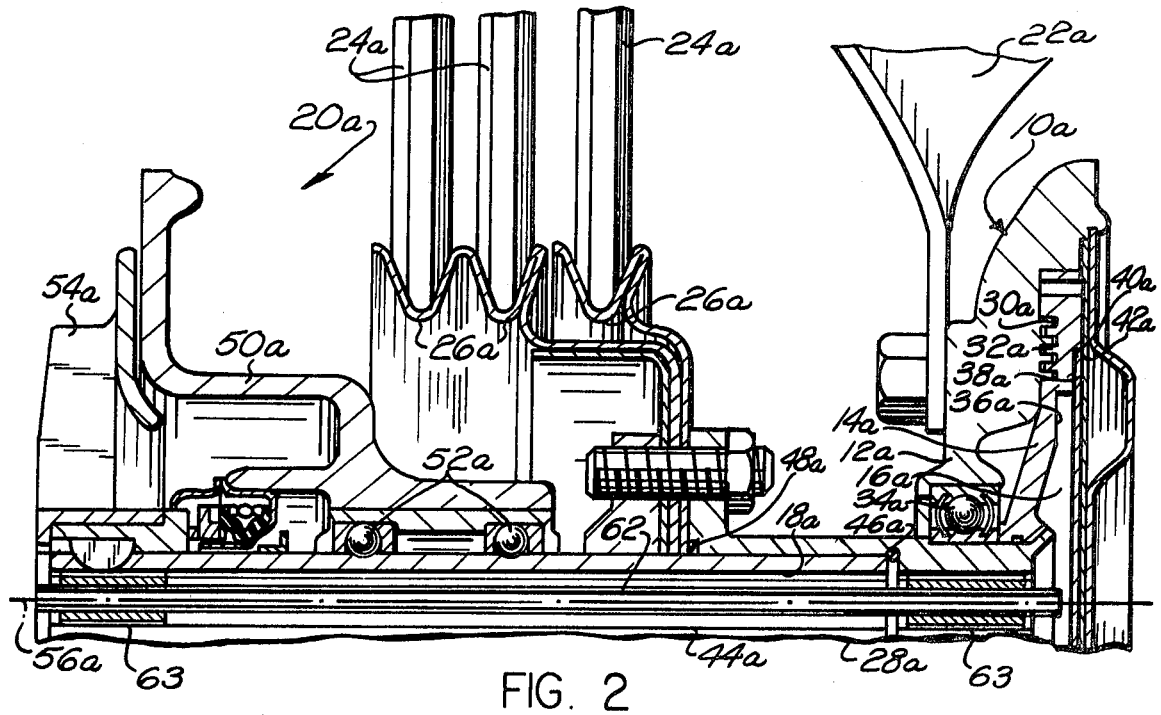
FIG. 2 is a partial cross-sectional view of a modified apparatus embodying the present invention.

A second embodiment of a liquid-cooled viscous coupling is shown in FIG. 2 having a similar construction to the coupling shown in FIG. 1. For ease of description, common reference numerals will be used in describing the viscous coupling of the second embodiment with the suffix "a" appended thereto. It should be understood that the viscous coupling 10a, as shown in FIG. 2, is of similar construction to the viscous coupling shown in FIG. 1, and to simplify description thereof only the structural differences will be hereafter described.

In the embodiment of FIG. 2, in order to carry the vapor away from the chamber 16a and condense the vaporized cooling medium, a tube 62 is provided having a centrally located bore therein. The tube 62 is supported in the conduit 18a by support members 63. The support members 63 allow the cooling medium to flow along the conduit 18a outside the tube 62 while supporting the tube 62. The tube 62 is in axial alignment with the rotational axis 56a of the input member 14a, output member 12a and conduit 18a. As the cooling medium flows through the conduit 18a toward the chamber 16a, the vapor moves along the tube 62 away from the chamber 16a. The cooling medium thus surrounds the vapor contained in the tube 62 and cools and condenses it throughout the entire length of the tube 62a. This provides for effective heat transfer and condensation of the vapor in the tube 62.

Figure 3:
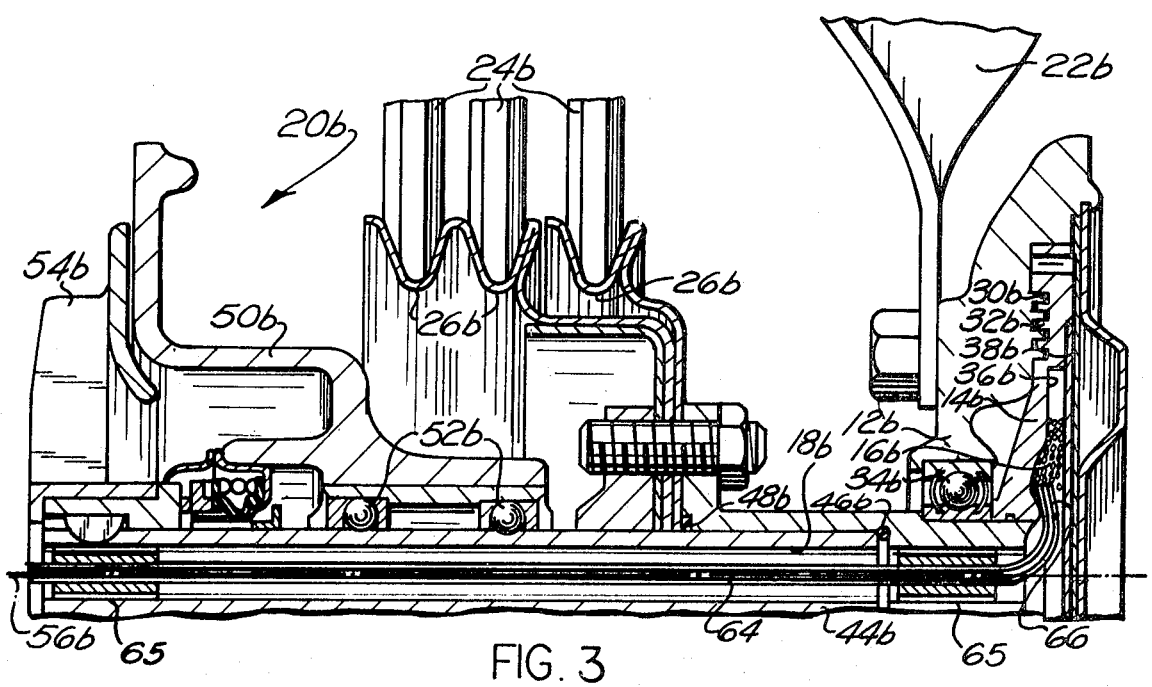
FIG. 3 is a partial cross-sectional view of a still further modified apparatus embodying the present invention.

A third embodiment of the viscous coupling is shown in FIG. 3 also having a similar construction to the coupling 10 shown in FIG. 1. Again for ease of description, common reference numerals will be used in describing the viscous coupling of the embodiment of FIG. 3 with the suffix "b" appended thereto. It should be understood that the viscous coupling 10b, as shown in FIG. 3, is of a similar construction to the viscous coupling shown in FIG. 1, and to simplify description thereof, only the structural differences will be described below.

In the embodiment of FIG. 3, a tube 64 is located along the rotational axis 56b and has a portion 66 extending into the cooling medium chamber 16b. The tube 64 is supported in the conduit 18a by support means 65, as shown in the embodiment of FIG. 2. The supports 65 allow the cooling medium to flow along the conduit 18a while supporting the tube 64. When the cooling medium in the chamber 16b vaporizes, it will gravitate toward the rotational axis 56b of the chamber 16b. Since the portion 66 of the tube 64 extends into the chamber 16b, the vapor will be received by the tube 64 and will gravitate or be "pumped" through the end of the tube 66 and along the tube 64 by the rotation of the tube, due to the lower gravity at the rotational axis 56b. The cooling medium surrounds the vapor contained in the tube 64 and cools and condenses the vapor as it moves through the tube 64. This provides for an effective heat transfer to condense the vapor in the tube 64.

It is apparent from the above that the present invention provides a new and improved viscous coupling which includes input and output members 14, 12, respectively. The input and output members 14, 12, respectively, define a shear space therebetween so that a viscous fluid in the shear space transmits torque from the input member 14 to the output member 12. The transmission of torque between the input and output members 14, 12, respectively, results in the generation of heat. The input member 14 has a chamber 16 for receiving a cooling medium which dissipates at least a portion of the heat generated. The cooling medium vaporizes upon application of the heat thereto and conduit means 18 directs the cooling medium into the chamber 16 and provides for cooling of the vaporized cooling medium. As a result of this structure, effective cooling can be provided, and a viscous coupling having a long life and a high torque-transmitting capability is provided. In fact, couplings of this construction may transmit torque only capable of substantially larger viscous couplings of known constructions.

Having described my invention, what I claim is:

1. A coupling apparatus comprising relatively rotatable input and output members, said input and output members defining a shear space therebetween, a viscous fluid in said shear space for transmitting torque between said input and output members with transmission of torque resulting in the generation of heat in said viscous fluid, said viscous fluid being of the type which decreases in viscosity with temperature increases, one of said members having a chamber for receiving a cooling liquid for absorbing and dissipating a portion of the generated heat from said viscous fluid, said cooling liquid being vaporizable at the normal operating temperature of said viscous fluid, and conduit means for directing the cooling liquid into said chamber and said vapor from said chamber for condensation thereof to liquid, whereby the change in phase of said cooling liquid from liquid to vapor and condensation back to liquid results in dissipation of a substantial amount of the generated heat.

2. An apparatus as defined in claim 1 including a pump in fluid communication with said conduit means for supplying the cooling liquid to said chamber, and said conduit means comprising a hollow drive shaft for driving said one member having said chamber and rotatable therewith.

3. An apparatus as defined in claim 2 wherein the rotational axis of said conduit means is substantially coaxial with the rotational axis of said one member having said chamber therein, said one member having an outer surface defining said chamber adjacent the shear space between the coupling members for receiving said heat, said cooling liquid being forced outwardly toward the outer surface of said one member and said vapor being displaced inwardly toward the axis of rotation of said one coupling member upon rotation thereof.

4. An apparatus comprising relatively rotatable input and output members, said input and output members defining a viscous fluid shear space therebetween, viscous fluid of the type which decreases in viscosity with temperature increases located in said shear space for transmitting torque between said input and output members, the transmission of torque between said input and output members resulting in generation of heat in said viscous fluid, said input coupling member defining a chamber for receiving a cooling liquid for dissipating at least a portion of the heat, said shear space being located radially outwardly of the axis of rotation of the input coupling member, said chamber having a wall surface adjacent said shear space, said cooling liquid being forced to move radially outwardly of said chamber upon rotation of said input coupling member and into contact with said wall surface to absorb heat therefrom, said cooling liquid vaporizing upon the heat being applied thereto at said wall surface and the vapor being displaced inwardly by said cooling liquid toward the axis of rotation of the input coupling member, and conduit means for directing cooling liquid into said chamber and vapor therefrom for condensation thereof.

5. An apparatus as defined in claim 4 further including a pump, said conduit means including a hollow drive shaft communicating with said pump to direct cooling liquid into said cooling chamber.

6. A torque transmitting mechanism comprising a rotatable input member, a rotatable output member, and a torque transmitting interface therebetween, said torque transmitting interface allowing slippage of said members relative to each other during transmission of torque therebetween causing heat to be generated at said torque transmitting interface during operation of said torque transmitting mechanism, one of said members including a chamber having a first portion adjacent said torque transmitting interface and a second portion remote from said torque transmitting interface radially inwardly of said first portion, a liquid cooling medium disposed in said chamber, said liquid cooling medium being vaporizable at the normal operating temperature of said torque transmitting interface for cooling said interface, said vaporized cooling medium being displaced inwardly toward the axis of rotation of said one member into said second portion of said chamber, a source of said cooling medium, and conduit means extending from said source into the second portion of said chamber to continuously supply liquid cooling medium into said second chamber during operation of said mechanism and for conducting said vapor from said chamber for condensation thereof to liquid by the flow of liquid cooling medium thereinto.

7. An apparatus comprising relatively rotatable input and output members, said input and output members defining a shear space therebetween so that a viscous fluid in said shear space transmits torque between said input and output members, the transmission of torque between said input and output members resulting in the generation of heat, one of said members having a chamber for receiving a cooling medium for dissipating at least a portion of the generated heat, conduit means having a passageway for directing the cooling medium into said chamber, said cooling medium vaporizing upon heat being applied thereto, said conduit providing cooling medium for cooling said vapor, and a tube located in said passageway, said tube having a bore therein for receiving the vapor from said chamber.

8. An apparatus as defined in claim 7 wherein said tube is located in said passageway and the cooling medium in said passageway cools and condenses said vapor received by said tube from said chamber.

9. An apparatus comprising relatively rotatable input and output members, said input and output members defining a shear space therebetween so that a viscous fluid in said shear space transmits torque between said input and output members, the transmission of torque between said input and output members resulting in the generation of heat, one of said members having a chamber for receiving a cooling medium for dissipating at least a portion of the generated heat, and conduit means for directing the cooling medium into said chamber, said cooling medium vaporizing upon heat being applied thereto, said conduit providing cooling medium for cooling said vapor, said conduit means being connected with said one member having said chamber and adapted to rotate therewith, the rotational axis of said conduit means being substantially coextensive with the rotational axis of said one member having said chamber therein, said one member having an outer surface defining said chamber adjacent the shear space between the coupling members for receiving said heat, said cooling medium gravitating toward the outer surface of said one member and said vapor gravitating toward the center of said chamber upon rotation of said one member, said conduit means including a tube having a bore therein, said tube being positioned inside said passageway for receiving said vapor and having a longitudinal axis substantially coextensive with said rotational axis of said one member having said chamber therein and conducting the vapor therealong from said chamber for cooling said vapor with the cooling medium in said conduit.

10. An apparatus as defined in claim 9 wherein said tube includes a portion extending radially from the longitudinal axis of said tube and into said chamber for receiving the vapor and pumping the vapor along the bore of said tube away from said chamber.

11. An apparatus comprising relatively rotatable input and output members, said input and output members defining a viscous fluid shear space therebetween, the transmission of torque between said input and output members resulting in generation of heat, said input member defining a chamber for receiving a cooling medium for dissipating at least a portion of the heat, said shear space being located radially outwardly of the axis of rotation of the input coupling member, said cooling medium tending to move radially outwardly of said chamber upon rotation of said input member and said cooling medium vaporizing upon the heat being applied thereto and the vapor tending to be disposed along the axis of rotation of the input member, a hollow drive shaft for driving said input member, said hollow shaft communicating with said chamber for directing coolant into said chamber and providing for removal of said vapor from said chamber, and a water pump communicating with said hollow shaft to provide a pressurized cooling medium in said cooling chamber, said hollow drive shaft having a tube supported centrally thereof for conducting vapor from said chamber, said vapor being cooled by the cooling medium in the hollow drive shaft externally of the tube.

* * * * *